June 19, 1962   P. J. FRICKERT, JR., ETAL   3,039,169
METHOD AND APPARATUS FOR FORMING CLOTH-LIKE MATS
OF ORIENTED CONTINUOUS STRANDS
Filed Oct. 12, 1955   6 Sheets-Sheet 1
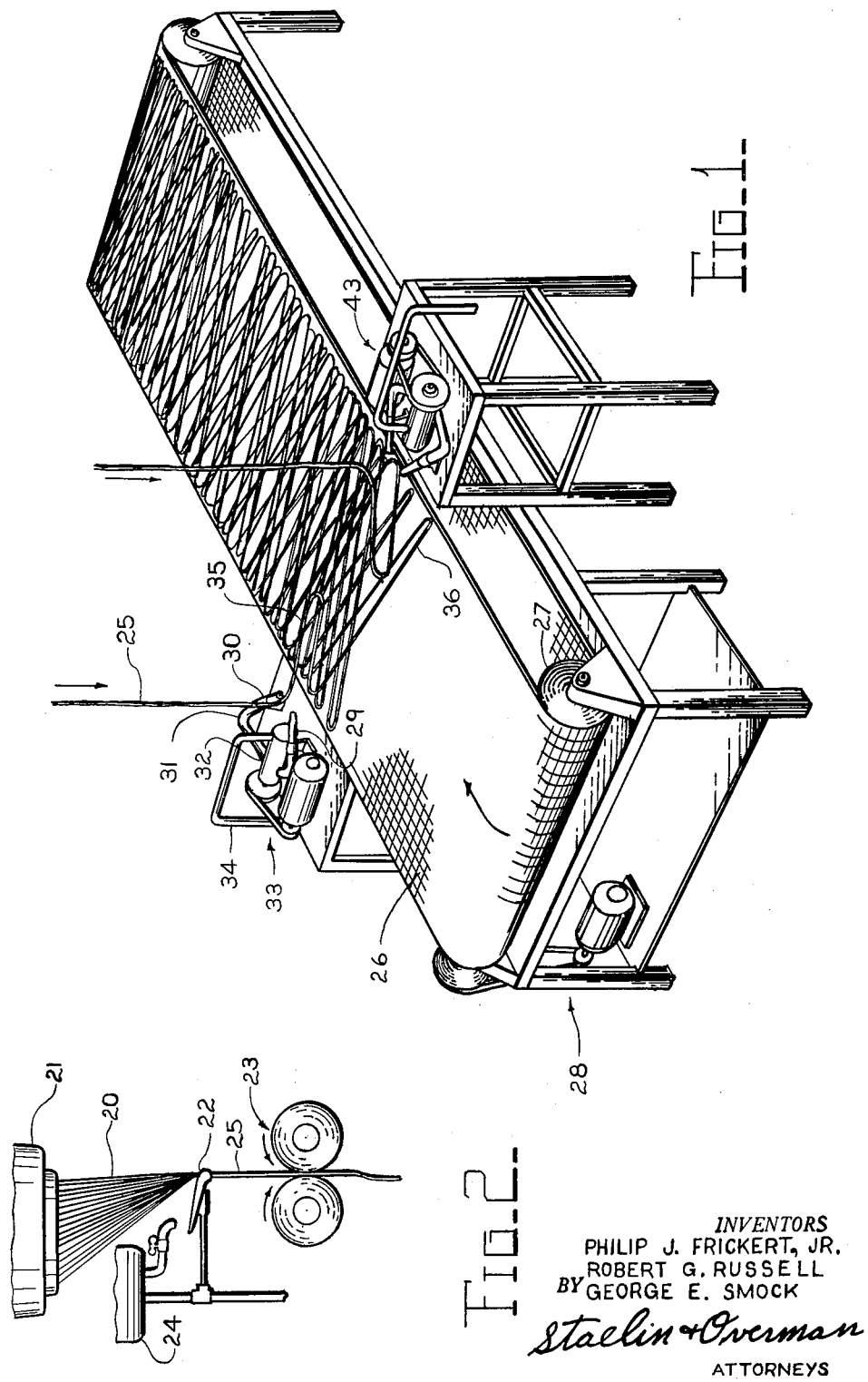
INVENTORS
PHILIP J. FRICKERT, JR.
ROBERT G. RUSSELL
GEORGE E. SMOCK
BY
Staelin + Overman
ATTORNEYS

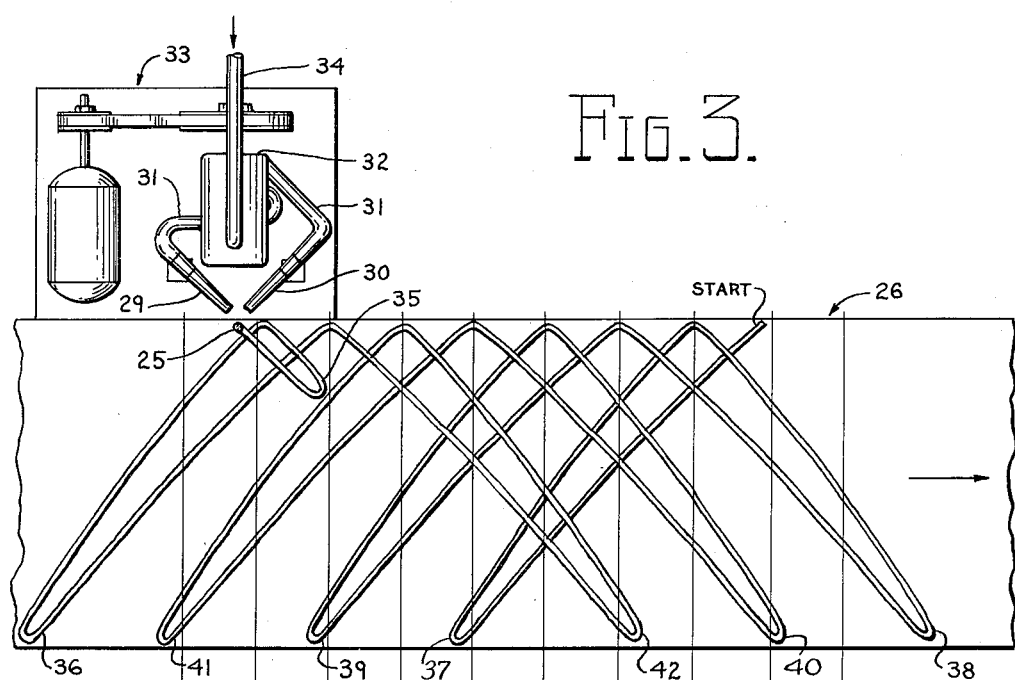
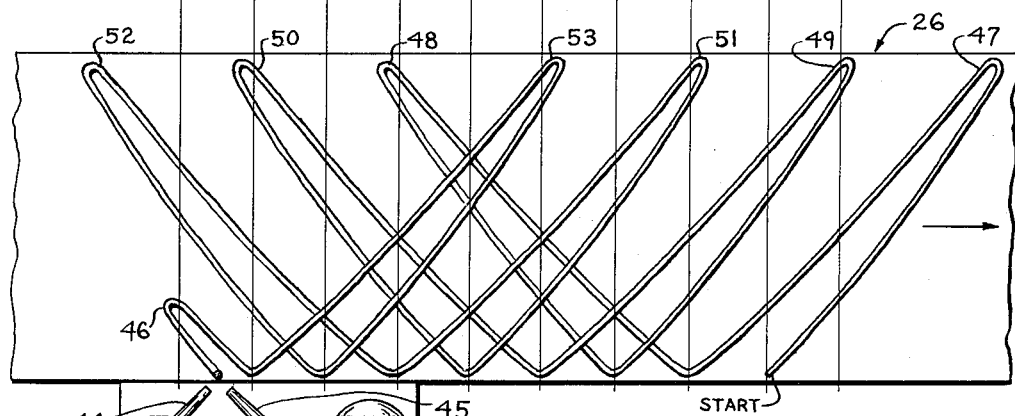

June 19, 1962 P. J. FRICKERT, JR., ETAL 3,039,169
METHOD AND APPARATUS FOR FORMING CLOTH-LIKE MATS
OF ORIENTED CONTINUOUS STRANDS
Filed Oct. 12, 1955 6 Sheets-Sheet 3

INVENTORS
PHILIP J. FRICKERT, JR.
BY ROBERT G. RUSSELL
GEORGE E. SMOCK
Staelin & Overman
ATTORNEYS

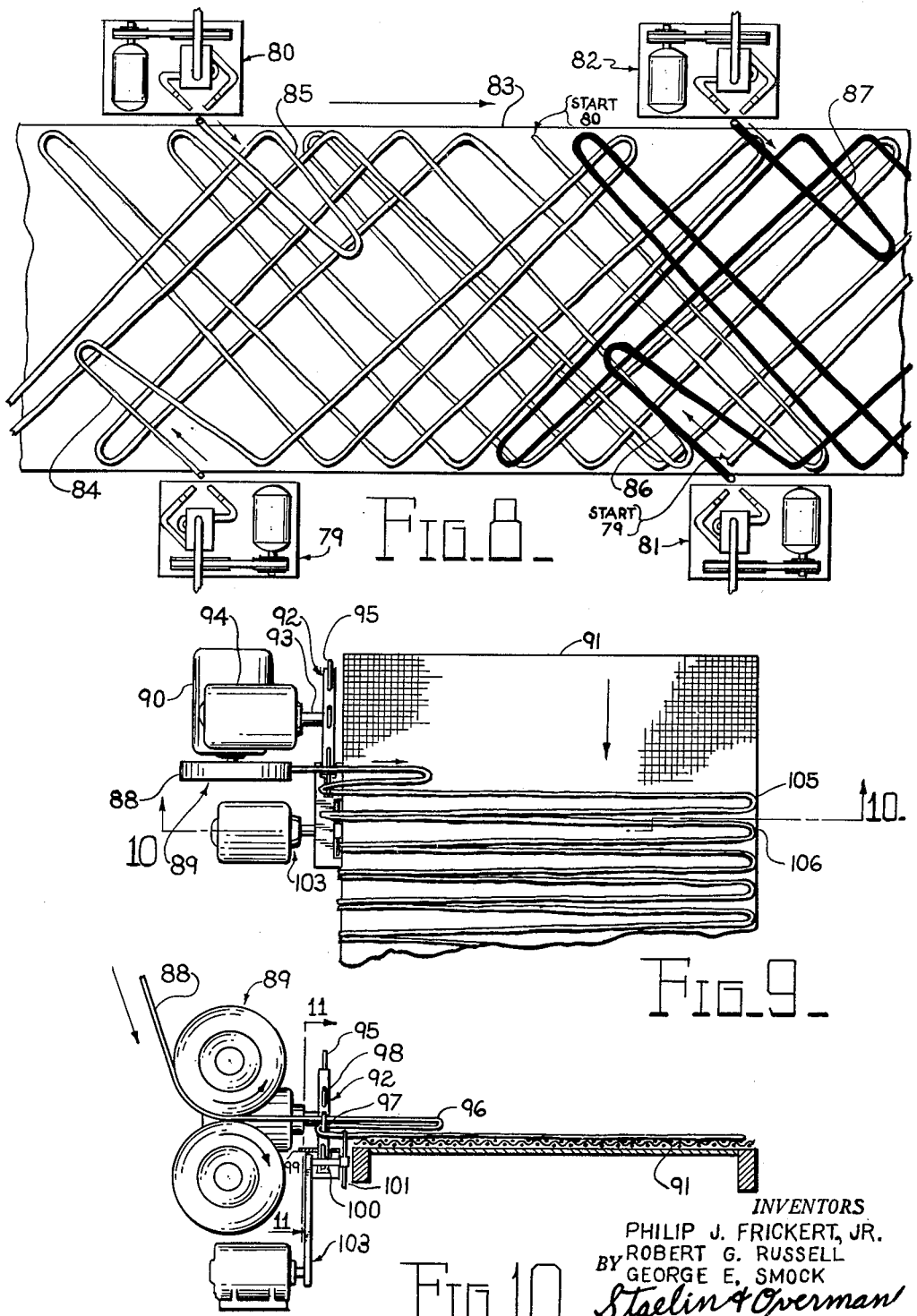

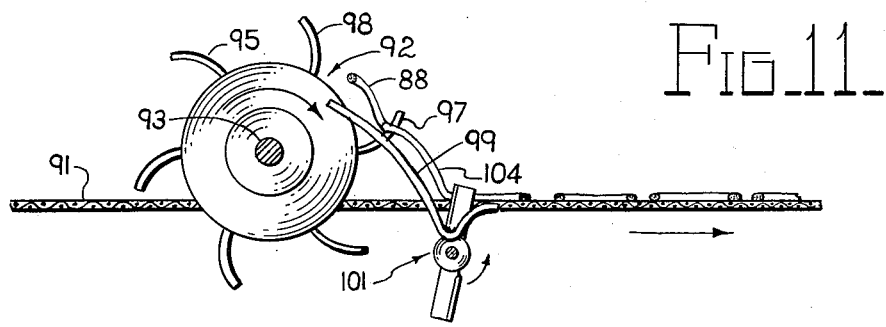
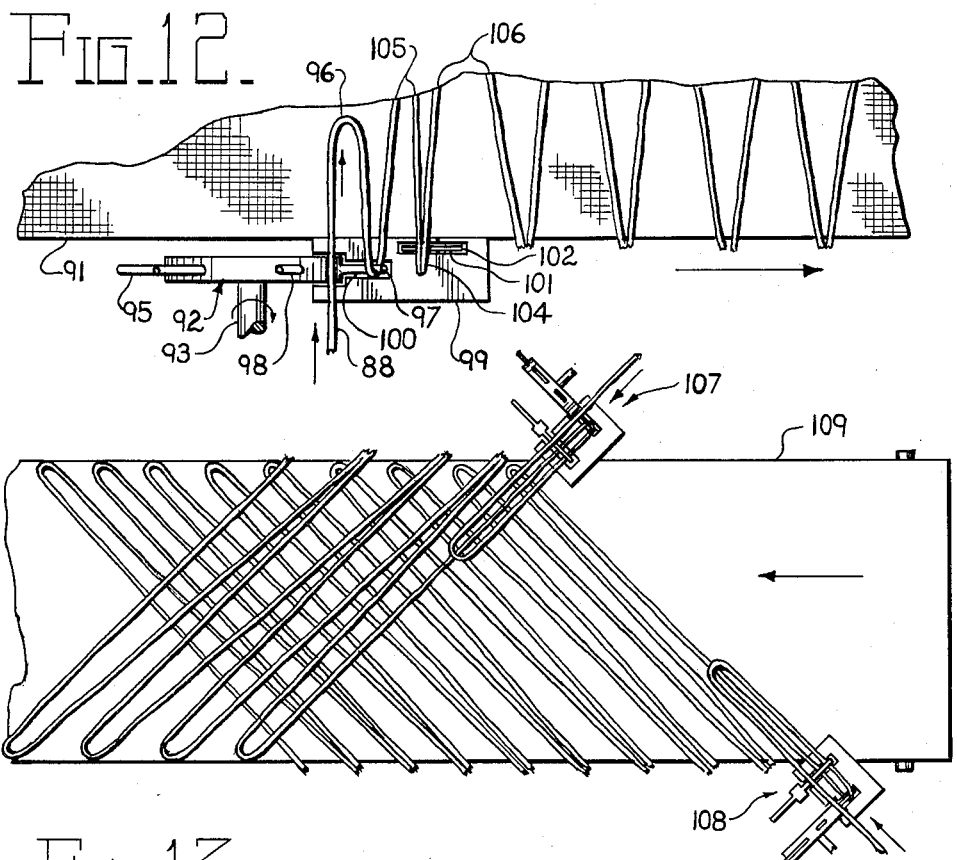

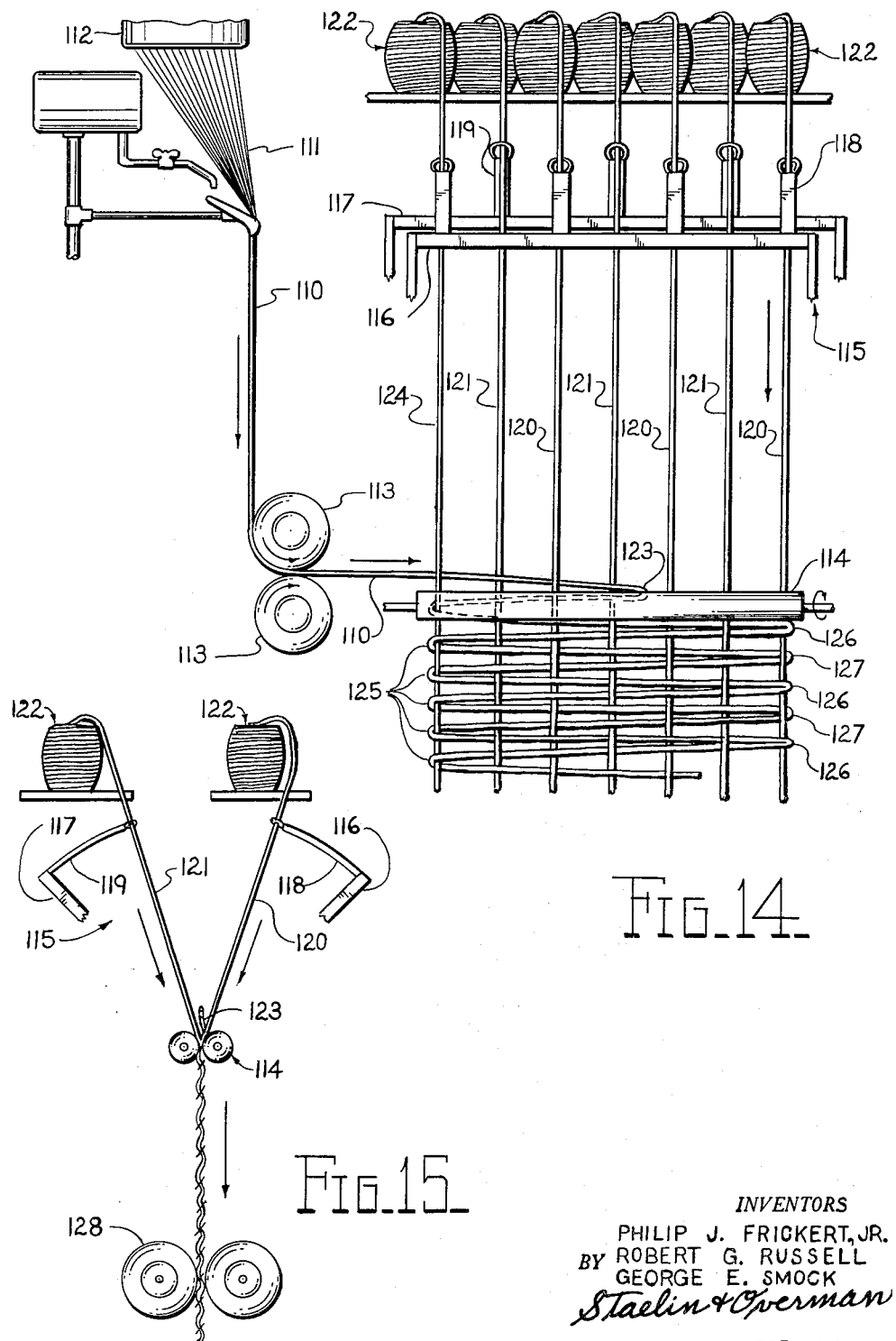

United States Patent Office 3,039,169
Patented June 19, 1962

3,039,169
METHOD AND APPARATUS FOR FORMING CLOTH-LIKE MATS OF ORIENTED CONTINUOUS STRANDS
Philip J. Frickert, Jr., Anderson, S.C., and Robert G. Russell, Granville, and George E. Smock, Newark, Ohio, assignors to Owens-Corning Fiberglas Corporation, Toledo, Ohio, a corporation of Delaware
Filed Oct. 12, 1955, Ser. No. 540,064
6 Claims. (Cl. 28—1)

This invention relates to method and apparatus for continuously forming a cloth-like mat of oriented continuous strands.

The use of thin "mats" or blanket-like masses of threads, cords, yarns or strands for the purpose of reinforcing resinous bodies is well-known in the art. Several types of such thin mats have been utilized, depending upon the nature of the reinforcing medium and the percentage of loading of the resinous material which it is desired to achieve. Textile fabrics woven from cotton or glass have frequently been used where the mass to be reinforced is relatively thin and has complicated contours or where the "loading" of the mass is high.

Thin reinforcing mats have been fabricated from continuous strands, such as glass fiber strands, by depositing the glass fiber strands on a conveyor in random swirls and loops. The average density of the glass per square area is uniform but, of course, the actual density of the glass in any specific area varies from that present in any other area.

The use of random deposited swirls and loops has several disadvantages. First, the direction of reinforcement varies in different portions of the mat. Second, because of the random deposition of the fibers it is difficult to tightly enough compact the loops and swirls of fibers to make a high density mat for loading the resinous material any higher than, say, 40 to 50 percent by weight. Third, because of the irregularities of the random deposition there are areas in such a mat where very few reinforcing strands are present.

Some of the foregoing difficulties are overcome by the use of woven cloth. The use of cloth permits a much higher loading of the resinous material and it results in there being a uniform distribution of the reinforcing medium through the resinous mass. A tightly woven cloth, however, is difficult to conform to complex contours and the cost of cloth for reinforcing resinous materials is so high, because of the numbers of steps required to manufacture the cloth, that its use is restricted by economic considerations.

It is an object of this invention to provide a method and forms of apparatus upon which the method can be carried out, by means of which one or more continuous strands can be continuously placed in an oriented pattern on a moving conveyor or sheet to provide a cloth-like mat which may be produced at low cost.

It is another object of this invention to provide a method and apparatus by which a glass fiber strand may be continuously produced and immediately oriented and deposited to form a reinforcing blanket or mat in which the orientation of the strand in the mat is controlled and substantially regular and in which the density, i.e., the quantity of continuous glass fiber strand present in any area may be made much higher than is possible when the strand is deposited in random loops and swirls.

The invention consists in a method and apparatus whereby one or more continuous strands of glass fibers are linearly projected into a working zone and are formed into serially connected bights or loops in which the lengths of strand forming the two sides of the loops are substantially parallel and the loops are then deposited on a conveyor or moving sheet with the elongated loops arranged in a definite pattern. By variations of the method and changes in the apparatus the pattern may be such that the lengths of strand in the loops lie either diagonally or perpendicularly across the conveyor or moving sheet and some may extend in one direction and others in another, so that a fabric-like arrangement of the strand lengths is produced.

The foregoing objects and the method and apparatus of the invention will be better understood from the following description and drawings in which:

FIG. 1 is a view in perspective of apparatus for forming a cloth-like blanket or mat of continuous glass fiber strands from a pair of continuous, longitudinally projected glass fiber strands.

FIG. 2 is a fragmentary view in elevation of means for continuously producing and projecting a glass fiber strand for utilization in the apparatus illustrated in FIG. 1 according to the invention.

FIG. 3 is a simplified plan view of the strand loops laid upon the conveyor or moving sheet by a strand depositing mechanism.

FIG. 4 is a view similar to FIG. 3 but showing the strand loops as laid upon the conveyor or moving sheet by a second strand depositing means that is located on the opposite side of the conveyor or moving sheet; the spatial relationship of FIGS. 3 and 4 being indicated by a grid of fine lines.

FIG. 8 is a fragmentary plan view showing the use of four or more strand loop forming and depositing mechanisms.

FIG. 9 is a fragmentary plan view of another form of apparatus for depositing strand loops on a conveyor or travelling sheet wherein the loops are illustrated as being formed substantially perpendicularly to the direction of movement of the conveyor or sheet.

FIG. 10 is a vertical sectional view taken substantially on the line 10—10 of FIG. 9.

FIG. 11 is an enlarged fragmentary vertical sectional view taken along the line 11—11 of FIG. 10.

FIG. 12 is a fragmentary plan view on an enlarged scale illustrating the strand forming means shown in FIG. 11.

FIG. 13 is a fragmentary plan view showing the deposition of loops of strand by two mechanisms such as that shown in FIGS. 9–12, inclusive, located on opposite sides of a conveyor or moving sheet and depositing the strand loops diagonally relative to the direction of movement of the conveyor or sheet.

FIG. 14 is a fragmentary view in elevation in simplified form, of a loom illustrating how loops of strand formed and deposited according to the invention may be projected into the shed of the loom to form the weft of a woven fabric.

FIG. 15 is an end view in elevation, also in simplified form, of the loom shown in FIG. 14.

Figure 5:
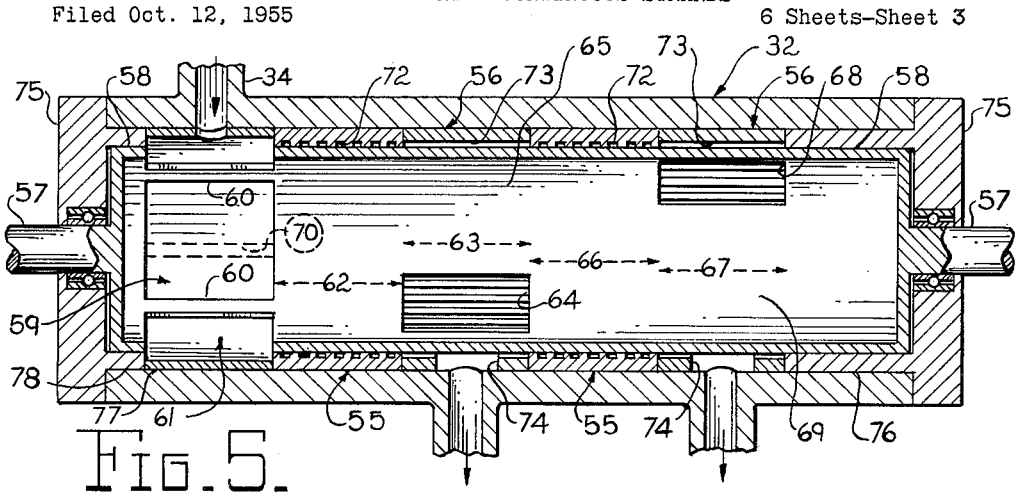
FIG. 5 is an enlarged, longitudinal, vertical cross section of a rotary valve for controlling the feeding of air to a loop forming and strand depositing mechanism.

In the following description of the method of the invention and of apparatus employing such method for the production of different types and forms of continuous cloth-like mats, the use of continuous glass fiber strands will be described and illustrated as an example of a continuous strand which may be handled by the method and apparatus of the invention.

Continuous glass fiber strands, each consisting of 200 or more individual filaments are excellent for reinforcing plastic masses because of their extremely high tensile strength in the order of 200,000 p.s.i.

A multifilament continuous glass fiber strand may be fabricated by the gathering together of a plurality of individual filaments 20 (FIG. 2) each of which is formed by cooling a stream of glass which flows through a minute orifice in the bottom of a glass melter or supply tank 21. The filaments 20 are gathered together by being led over a gathering shoe 22 and into the bite between the peripheries of a pair of high speed pulling wheels 23. The shoe 22 may also serve as an applicator for coating the filaments 20 with a suitable size, lubricant or other liquid material which may be dripped down to the shoe from a supply tank 24. When the individual filaments 20 are gathered together by the shoe 22 they comprise a multifilament strand 25 which is projected by the pulling wheels 23 along a linear path and at a high velocity, say in the order of 10,000 feet per minute.

In FIG. 1 such a strand 25 is shown as being projected downwardly at one side of a conveyor or moving sheet 26 which is guided and driven along a horizontal path or over a horizontal table by means of a roller 27 motivated by a conveyor drive generally indicated at 28.

The strand 25 is projected downwardly along a vertical path leading to the apex of a pair of air jets fed from nozzles 29 and 30 (see also FIG. 3). The nozzles 29 and 30 are connected by suitable pipes 31 to a valve housing 32 in which is located a valve that is rotated by a motor and pulley generally indicated at 33. Air under pressure is fed to the valve housing 32 by an air supply line 34. The valve in the housing 32 (shown in detail in FIGS. 5–7 to be described below) is so designed that it alternately connects the two nozzles 29 and 30 to the air supply so that puffs or short jets of air are emitted alternatively from the two nozzles 29 and 30.

In FIGS. 1 and 3 the strand 25 is shown as having a configuration which it assumes almost immediately after the supply of air jetting from the nozzle 30 has been cut off and the supply of air jetting from the nozzle 29 has started. The pressure of the air emitted from the nozzles 29 and 30 is such that it laterally deflects the continuous strand 25 horizontally across the conveyor 26 along a pathway determined by the direction in which the nozzle 29 or 30 is aimed. In FIGS. 1 and 3 a loop indicated at 35 is illustrated as being blown diagonally across the conveyor 26 in the direction of movement of the conveyor 26.

The next preceding loop 36 extends diagonally across the conveyor 26 in a direction opposite to its direction of movement and was formed by the next preceding jet emitted from the nozzle 30. Similarly by alternating air to the nozzles 29 and 30, loops of strand are led diagonally across the conveyor 26 at 90° to each other and at 45° to the direction of movement of the conveyor 26.

In FIG. 3 the first formed loop, indicated by the number 37, was formed by a jet of air from the nozzle 30, followed by a jet of air from the nozzle 29 which formed the loop 38, and then a jet of air from the nozzle 30, forming the loop 39, and so forth, forming the alternately directed loops 40—41, 42—36 and finally, the loop 35 which is shown in process of formation.

In referring to FIGS. 1, 3 and 4, it should be noted that the spacing between the individual loops and the exact configuration of the individual loops is only illustrative and that both of these depend upon the ratios of speeds between the linear speed of movement of the strand 25, the speed of rotation of the valve in the housing 32 and thus the frequency of alternation of air from the jets 29 and 30, and the speed of movement of the conveyor 26 or moving sheet.

FIG. 4 is similar to FIG. 3, but reversed, and shows the loops of strand laid down by a strand interrupting mechanism generally indicated at 43 and identical in construction and operation to the strand mechanism comprising the valve housing 32 (FIGS. 1 and 3), and including a pair of oppositely directed jet nozzles 44 and 45.

By reference to FIG. 1 and a comparison between FIGS. 3 and 4, it will be seen that at the same time that the loop 35 is being formed by a jet of air from the nozzle 29, an oppositely directed loop 46 is being formed by a jet of air from the nozzle 45 (FIG. 4). The two sets of nozzles 29—30 and 44—45 are synchronized in their operation one with the other, so that they "fire" in opposite directions simultaneously, to prevent entanglement of the loops formed and projected from opposed sides of the conveyor 26 or other moving sheet upon which the loops are deposited. Thus the first loop, indicated at 47, which is formed by the mechanism 43 (FIG. 4) is formed and deposited upon the conveyor 26 concomitantly with the formation and deposition of the first loop 37 (FIG. 3). Successively formed loops in FIG. 4 are indicated by the numbers 48, 49, 50, 51, 52 and 53 and the partially formed loop 46, such loops being formed and deposited at the same time, respectively, as the loops 38, 39, 40, 41, 42, 36 and 35 of FIG. 3.

In FIGS. 1, 3 and 4 no attempt has been made to illustrate the actual interweaving of loops formed and projected from opposite sides of the conveyor 26 or other moving sheet. It will be appreciated that each loop formed and projected from either side of the conveyor 26 will overlie portions of any loops previously projected from either side of the conveyor 26 and, as a result, there will be a certain interweaving of the loops in certain areas of the finished structure formed upon the conveyor 26 or other moving sheet.

The fine line grid extending across FIGS. 3 and 4 aligns the two figures one with the other and illustrates how the end of each loop, for example, the loop 37 in FIG. 3, lies on the side of the conveyor 26 generally opposite the end of the loop 48 in FIG. 4. Similarly, the ends of the loops 49 and 38, for example, lie on opposite sides of the conveyor 26 and generally in alignment with each other. In FIGS. 3 and 4 the starting point of each of the patterns illustrated is indicated by the legend "start." It will be seen that the two words "start" on opposite sides of the conveyor 26 are aligned with each other.

The construction of the valve housing 32 and of the valve contained therein is somewhat limited in its design because of the necessity for alternate actuation of the two nozzles 29 and 30 or 44 and 45 in order to prevent either overlapping of the jets of air or delay between the cessation of one and the start of the other.

If the two jets of air from the nozzles 29—30 or 44—45 overlap, the strand will be affected by both and it will move in a direction determined by the resultant of the two forces of the two jets of air from the oppositely directed nozzles. Since it is not desired to sweep the strand arcuately across the conveyor 26, but instead to first lay it in one direction and then in the other, each of the jets from the nozzles 29—30 or 44—45 must cease, or at least have been reduced to virtually nothing, before the other jet is started.

Because the strand 25 is being fed downwardly across the apex between the two lines of direction of the nozzles 29—30 or 44—45, there can be no appreciable delay between the cessation of one jet and the beginning of the other or the strand 45 would pass beyond the nozzles 29—30 or 44—45 and pile up either on the floor or on the edge of the conveyor 26.

Figure 6:
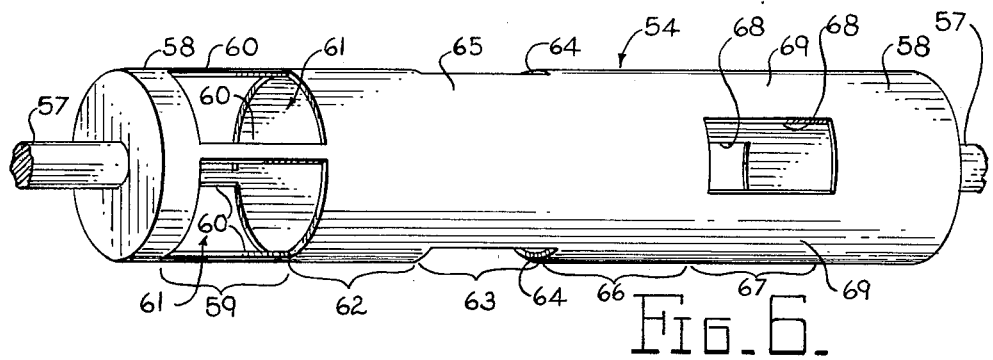
FIG. 6 is a view in perspective of a valve rotor.
Figure 7:
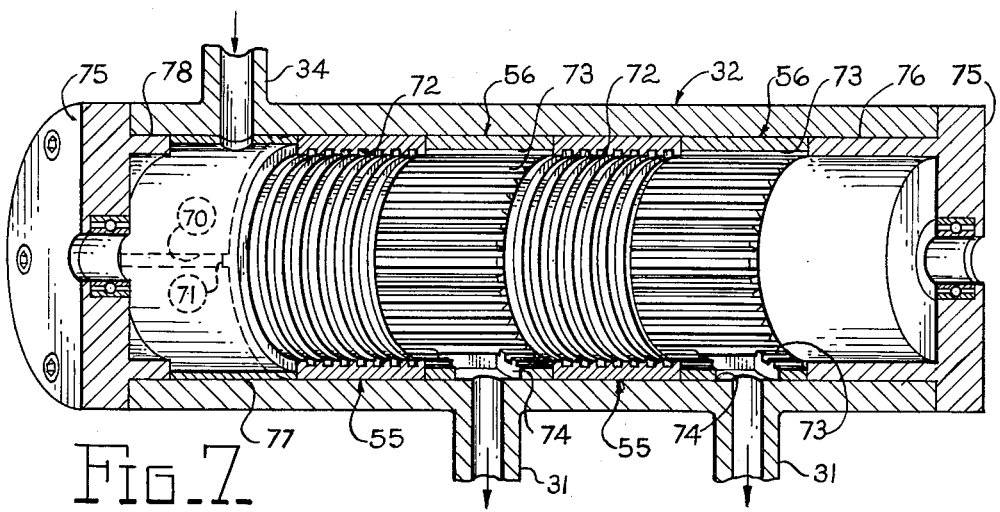
FIG. 7 is a half section in perspective of a valve stator.

The valve structure of FIGS. 5, 6 and 7 includes a driven rotor generally indicated at 54 (FIG. 6) and the housing 32 which acts as a stator and which contains two different types of annular sealing elements 55 and 56. The rotor 54 is a hollow tubular structure having a stub shaft 57 at each end and a short cylindrical section 58 into which each of the shafts 57 is mounted. Starting at the left side of the rotor 54 its first operative portion consists of a substantially open cage 59 formed by a plurality of thin longitudinally extending bars 60 leaving side openings 61 therebetween. A second section 62 of the rotor 54 has imperforate walls and longitudinally spaces the cage section 59 from a first output valve section 63. The output valve section 63 has two oppositely located openings 64 spaced by oppositely located imperforate wall sections 65. A second imperforate section 66 spaces the first valve section 63 from a second valve section 67. The second valve section 67 is similar to the valve section 63 but is "out of phase" therewith, i.e., its openings 68 and imperforate sections 69 are centered 90° from those of the first valve section 63.

The housing 32 has a generally tubular interior along one wall of which is milled a longitudinally extending keyway 70 for the reception of keys 71 in order to position the four sealing elements 55 and 56 of which there are two of each. Each of the sealing elements 55 is an annular sleeve on the inner surface of which are cut a plurality of circumferentially extending grooves 72 forming a labyrinth seal over the areas 62 and 66 of the rotor 54 to prevent the flow of air around the exterior of the rotor 54 between the input area 59 and output valve areas 63 and 67 or between those two areas.

Each of the sealing elements 56 is an annular sleeve-like piece having a plurality of axially extending grooves 73 broached on its inner surface and forming a labyrinth seal extending circumferentially around each of the output sealing areas 63 and 67 of the rotor 54 to prevent the flow of air circumferentially around the rotor from the output openings 64 and 68 of the rotor 54 to output slots 74 milled in the elements 56 and aligned with the pipes 31 of the housing 32 which lead to the nozzles 29—30 or 44—45.

The valve housing 32 is closed at each end by a cap 75 the right-hand one of which has a sleeve 76 extending into the interior of the housing 32 to space the elements 55 and 56 therein.

At the other end of the four elements 55 and 56 there is located a thinner spacing sleeve 77 against which a sleeve-like extension 78 of the end cap 75 is tightened to lock the four sealing elements 55 and 56 in position from the left end. The inside diameter of the spacing sleeve 77 is greater than the inside diameter of the sealing elements 55—56 or the outside diameter of the rotor 54. The spacing sleeve 77 thus leaves an annular chamber extending around the exterior of the cage portion 59 of the rotor 54 into which the input air line 34 communicates.

Air thus flows in through the line 34 into the cage area 59 and then into the interior of the rotor 54 and is alternately emitted through the lines 31 upon rotation of the rotor 54 in the housing 32.

It will be observed in FIGS. 6 and 7 that the arcuate extent of the slots 74 is identical with the openings 64 and 68 and one-third of the arcuate extent of the imperforate sections 65 and 69. The openings 64 and 68 are centered on the opposed imperforate areas 69 and 65 in the other one of the rotor portions 63 or 67. Each imperforate area 69 or 65 closes its respective output slot 74 before the opposed rotor openings 64 or 68 cracks open to its output opening 74. The imperforate areas 69 or 65 are three times as long as the openings 64 or 68.

Thus upon rotation of the rotor 54 air is admitted to one of the lines 31 at the same instant that its flow through the other of the lines 31 is cut off and air is prevented from flowing through either one of the lines 31 all during the time in which it is flowing through the other of the lines 31.

Rotation of the rotor 54 of the valve on one side of the conveyor 26 at a fixed speed and in oppositely phased synchronism with the rotor 54 in the valve on the other side of the conveyor 26 results in simultaneous and opposite projection and deposition of the strand loops as shown in FIGS. 3 and 4.

FIG. 8 illustrates a layout employing four of the loop forming and depositing structures similar to the structure 33 or 43 and indicated at 79—80 and 81—82. As in the case of FIGS. 1, 3 and 4, two of the structures 79 and 80 are diametrically opposed on opposite sides of a conveyor or moving sheets 83 and the other two structures 81 and 82 are opposite each other some distance away from the two structures 79 and 80. The distance between the pair of mechanisms 79—80 and the pair of mechanisms 81—82 is such that loops being "fired" from the structure 81 pass but do not engage loops being fired from the structure 80 and, similarly, loops being fired from the structures 79 and 82 do not entangle each other.

The beginning of the first loop laid down by each of the mechanisms or structures 79 and 80 is indicated by the slogans "start 79" and "start 80" in FIG. 8. In the drawing the strand pattern is shown as if the structure 79 started operating 1½ cycles earlier than the first operation of the structure 80.

In FIG. 8 all four of the structures 79—82 are shown as simultaneously forming loops indicated at 84, 85, 86 and 87, respectively. The strands being formed and deposited by the structures 81 and 82 are shown in solid lines and those being formed by the structures 79 and 80 in open lines. Only a few of the loops of strand laid down by each of the structures 79—82 are shown in FIG. 8 and the loops of strand are shown in relatively open or spaced position.

By increasing the frequency of the alternation of the jets of air in the oppositely directed nozzles of the structures 79—82, loops of strand may be formed and deposited more nearly adjacent each other on the conveyor 83. If it is desired to increase the quantity of strand deposited on any given length of the conveyor 83, additional pairs of mechanisms may be positioned thereon and so spaced relative to the pairs of mechanisms 79—80 and 81—82 that the loops of strand formed thereby may fall between the loops formed and deposited by each of the mechanisms 79—82 or may lie on top of the loops formed and deposited by these numbered mechanisms. In order to increase or decrease the quantity of reinforcing material present in any given area, the frequency of alternation of the jets and/or the number of loop forming and depositing mechanisms may be increased or decreased correspondingly. The maximum number of strand depositing mechanisms which may be located adjacent a conveyor is determined only by the minimum spacing between adjacent pairs. This spacing is determined by the necessity for preventing the entanglement, for example, of the loops 85 and 86 being simultaneously formed by the mechanisms 80 and 81 respectively.

While the loops are shown as being formed and deposited along lines lying at angles of 45° relative to the direction of movement of the conveyor 83, it will be appreciated that they may be projected at any angle from perpendicular to substantially parallel. There appears to be little reason, however, for projecting them at angles less than 45° to the direction of movement of the conveyor. If they are projected at angles greater than 45° and less than 90°, the minimum spacing distance between successive pairs of mechanisms, may be reduced correspondingly.

In the forms of mats or cloth-like webs of loops of strand according to the invention as above described, it may be desired to give the finished mat structural integrity. This may most easily be accomplished by spraying the finished product with a binder or by coating the strands as they are fabricated (FIG. 2) with a liquid binder which will cause adhesion between overlying portions of the various strand loops.

If the web or cloth-like mat formed by the deposition of the strand loops according to the invention is subsequently treated with a binder to give it structural integrity, it may be removed from the conveyor by merely being rolled up on a spindle.

So far in the description, the method and apparatus of the invention have been principally described in connection with the formation of webs of cloth-like mats for the purpose of reinforcing resinous materials such as sheets and thin complex forms. The same method and apparatus, however, may also be employed for the purpose of forming and depositing loops of continuous strand-like materials directly upon the surface of sheet material which it is desired to reinforce. For example, in place of the conveyor 83, the loops may be deposited on a sheet of heavy kraft paper coated with an adhesive or binder, such as asphalt, and the strand loops projected and laid upon the asphalt while it is soft. A second sheet or layer of paper may then be guided on and pressed against the asphalt, being sealed by the asphalt on the opposite side of the loops of strand. Such a laminar paper then possesses the characteristic of great strength, resulting from the presence of the loops of strand, and is waterproof because of the binder or coating material. Reinforced waterproof papers of this kind find great utility in the packaging of instruments or other items which need protection.

Because the angular relationship between the loops of strand and the direction of movement of the conveyor or sheet being reinforced is variable merely by varying the directions of the nozzles, the relationship between the loops may be changed at will, for example, in preparing a reinforcing mat for particular resinous shape where the angle of intersection between the loops may be adjusted to permit the cloth-like web to conform more easily to the contours of the part being formed.

FIGS. 9–13 illustrate a variation or modification of the method, and different apparatus embodying the invention, by which a cloth-like mass of oriented loops of strand may be formed and deposited upon a continuous conveyor or moving sheet. In these figures a continuous strand 88 is fed by a pair of high speed rotary pulling wheels 89 that are driven by a motor 90. In this case the strand 88 is projected horizontally from one side of a conveyor 91 into a working area defined by a rotary pin wheel generally indicated at 92. The pin wheel 92 may be mounted, for example, upon a shaft 93 of a motor 94 so located that a plurality of backwardly sweeping pins 95 on the pin wheel 92 pass across the path of movement of the strand 88 as it leaves the pulling wheels 89. As each of the pins 95 sweeps across the path of movement of the strand 88, it catches the strand 88 which continues to move longitudinally past the pin on which it is caught until a subsequent pin crosses its path. In FIG. 12 a loop indicated at 96 is shown in the process of being formed, its one end being caught upon a pin 97 of the pin wheel 92 and the strand 88 feeding across the conveyor 91 in front of a next following pin 98.

An arcuate guide 99 has a slot 100 through which the pins 95 sweep as the pin wheel 92 rotates. Because the pins 95 are swept backwardly, they carry the ends of the loops in the strand 88 downwardly against the guide 99 and then withdraw from the looped ends, throwing the looped ends of the strand 88 down to the bottom of the guide 99. A rotating bladed cutter 101 operates through a spaced slot 102 in the guide 99 and severs the looped ends of the strand 88 from the lengths of strand on the conveyor 91. The cutter 101 may be driven, for example, by a motor and belt generally indicated at 103 (FIG. 10).

As each pin 95 catches a loop of the strand 88 and throws it downwardly into the trough formed by the guide 99, one of the blades of the cutter 101 sweeps around and cuts off the looped end, for example, the end of the loop indicated by the reference number 104. By proper synchronism between the rotation of the pin wheel 92 and the cutter 101 and by correlation of the pin wheel 92 with the speed of the strand 88 and the width and speed of the conveyor 91, generally V-shaped double spans or loops of strand, for example, those indicated by the reference numbers 105 and 106, etc. in FIGS. 9 and 12, are deposited upon and carried away by the conveyor 91.

It may be desirable under some circumstances to form and project the loops so that they extend directly across the conveyor as shown in FIGS. 9–12. This may be particularly desirable, for example, when reinforcing paper where the maximum strength is desired in a direction perpendicular to the length of the paper. It may also be advantageous in some manufacturing processes to form bights or loops of strand as shown in FIG. 9 and to deposit them upon a conveyor since they can be delivered for a subsequent manufacturing process. For example, in the fabrication of glass fiber roofing mops a plurality of such doubled bights of strand might be gathered together and clamped at one end to a handle, the mass of strand thus forming a mop for the application of hot asphalt.

In keeping with the general spirit of the invention, however, it is most probable that the mechanism and method of the invention would be employed as illustrated in FIG. 13. In FIG. 13 a pair of strand feeding mechanisms of the type shown in FIGS. 9–12 are generally indicated at 107 and 108 with one of the mechanisms being located on each side of a conveyor 109. The arrangement of FIG. 13 and the operation of the mechanisms 107 and 108 differs however from the arrangement and operation shown in FIGS. 1, 3 and 4 because there is no necessity for synchronization between the two mechanisms 107 and 108. Each of them "fires," i.e., forms and deposits its loops on the conveyor 109 along a single direction. Because the mechanisms 107 and 108 do not alternately direct the projection of the loops, they can merely be spaced from each along the conveyor 109 a distance sufficient to prevent entanglement of the loops as they form and operate independently of each other.

As in the case of the earlier described method and apparatus, more than two of the mechanisms 107 and 108 may be positioned along the length of a single conveyor or sheet of moving material in order to increase the quantity of glass deposited and thus the density of the cloth-like mat produced.

FIGS. 14 and 15 illustrate the formation and deposition of loops of a continuous strand according to the invention as the weft threads of a woven cloth-like mat, as contrasted to the formation and deposit of loops of continuous strand for the formation of cloth-like mats or masses of strand in which there is no actual woven pattern.

As shown in FIGS. 14 and 15 a continuous strand 110 may be formed as needed by the association of a plurality of individual fibers 111 which are attentuated by a pair of pulling wheels 113 from molten streams flowing through minute orifices in the bottom of a melter or glass supply tank 112. The strand 110 may also be fed from a source, such as a reel or package if formation at the time of subsequent treatment is not practicable or desirable. In either case, the strand 110 is projected horizontally by the pulling wheels 113 which are located laterally adjacent and with their bite at a level vertically just above the level of the nip between a pair of feeding rollers 114 constituting a portion of a loom fragmentarily and generally indicated at 115.

The loom 115 has the usual pair of harnesses 116 and 117 which are provided with suitable heddles 118 and 119, respectively, for guiding front and back warp threads 120 and 121. The warp threads 120 and 121 may be pulled from spools or packages 122 of continuous strand, thread or cord.

In FIGS. 14 and 15 the harnesses 116 and 117 are shown as having only four and three heddles 118 and 119, respectively, for purposes of simplification of the drawings. It will be appreciated, of course, that the number of warp threads in the fabric to be woven and correspondingly the numbers of heddles on the harnesses 116 and 117 will depend entirely upon the width and count of the fabric to be woven.

Because of the spacing of the pulling wheels 113 the continuous strand 110 is projected into the shed of the loom 115 at a position just above the nip of the feeding rollers 114. A loop 123 is shown in FIGS. 14 and 15 as extending approximately half way across the shed of the loom 115.

The mechanism for opening and closing the shed of the loom 115, i.e., for swinging the harnesses 116 and 117 back and forth, is so driven that the warp threads 120 and 121 cross the line of projection of the continuous strand 110 each time that a loop being formed, such as the loop 123, extends all the way across the shed. The closest warp thread, indicated specifically in FIG. 14 by the reference number 124, is thus swung back and forth across the lineal path of projection of the continuous strand 110 each time the shed closes and reopens with the warp threads 120 and 121 at opposite sides. Moving the warp thread 124 across the path of the continuously projected lineal strand 110 results in folding that strand 110 around the warp thread 124 as can be seen at the positions indicated by the reference number 125 in FIG. 14. The warp thread 124 in this operation according to the invention serves the same function as the jets 29—30 and 44—45 of FIGS. 1–7, the similar jets of FIG. 8, the pin wheel 92 of FIGS. 9–12 and the pin wheels of the mechanisms 107 and 108 of FIG. 13 in forming the loops to be deposited in controlled oriented pattern. In addition, the warp thread 124 also forms a part of the finished product.

The warp threads 120 and 121 as a group not only constitute a part of the finished thin mass of strand but they also serve the function of receiving the projected loops of continuous strand 110. From this standpoint the warp threads 120 and 121 are comparable to the conveyors or length of sheet material 26 of FIGS. 1 and 3, 83 of FIG. 8, and 91 of FIGS. 9–13, serving as a loop collecting or receiving means. The lineal speed of all these loop receiving means is varied to vary the density of each layer of loops that is collected and the width of the loop receiving means determines the ratio between the lineal speed of the continuous strand and the frequency of the strand interrupting or loop forming means.

Alternate loops indicated in FIG. 14 by the reference numbers 126 and 127 lie on opposite sides of the sets of warp threads 120 and 121. The loops 126 and 127 constitute weft threads in a woven finished fabric of length and width determined by the length of time which the loom is operated and, of course, by the width of its shed.

Longitudinal spacing of the weft threads (loops 126 and 127) along the fabric thus produced is determined by the relationship of the speeds of the mechanism which opens and closes the shed of the loom 115 and the lineal speed of projection of the continuous strand 110 with the feeding speed of the loom feeding rollers 114 and a pair of fabric feeding rollers 128 (FIG. 15). The speeds of the continuous strand 110 and the opening and closing of the shed must remain synchronized so that each individual loop is formed of a size appropriate to extend across the fabric. If the feeding speeds of the rollers 114 and 128 are increased the loops 126 and 127 are spaced farther from each other.

By arranging the loom so that the shed extends vertically and the warp threads 120 and 121 move downwardly, the shed opens upwardly and the continuously projected strand 110 is led into the nip between the rollers 114 by the force of gravity. While the loom might also be operated in a more nearly conventional position, i.e., with the fabric moving horizontally and the weft threads or projected loops 126 and 127 being thrown horizontally across the shed, the position shown in the drawing eliminates the necessity for employing any mechanisms to thrust the weft threads tightly into the bite between the rollers 114 and provides much more than enough vertical space through which the loops can be projected without danger of entangling contact between a forming loop and the warp threads 120 and 121.

As in the cases of the earlier described nonwoven or only partly woven masses of oriented, controlled pattern loops, the woven fabric produced by the mechanism and operation illustrated in FIGS. 14 and 15 may be given structural integrity by spraying or otherwise depositing a suitable adhesive on the material to bind the weft and warp threads together at their points of intersection.

Although it has been assumed, in discussing the apparatuses and methods of the invention, that all of the continuous loops of strand or the warp threads 120 and 121 of FIGS. 14 and 15 are made from the same material, it will be appreciated that the strand 25 fed by the mechanism 33 in FIG. 1 might be made from one type of material, say glass fibers, while the other strand fed by the mechanism 43, might be made from a different material, for example any natural or synthetic fibrous material having characteristics desirable for the ultimate use of the cloth-like mat being fabricated. Similarly in the operations illustrated in FIGS. 8 and 13 the several strands deposited upon a single conveyor may be made of different materials and, in FIGS. 14 and 15 the warp threads 120 and 121 might be made of one material while the weft loops 126 and 127 might be made of another.

The width, number of strand sections per unit of area, i.e., density, and thickness of products manufactured according to the invention are determined by the use to which those products are to be put. Mats for plastic reinforcement may be made at any desired density by utilizing a greater number of strand loop forming and depositing means. In this way each loop forming and depositing mechanism or pair of loop forming and depositing mechanisms can be spaced along a continuous conveyor from a preceding mechanism or pair of mechanisms and the final product built up in superimposed strands or loops.

In addition to the fabrication of mats or cloth-like masses for resin reinforcement, the practice of the instant invention also permits the rapid fabrication of scrim-type fabrics, decorative fabrics where the pattern of the strands may provide the decoration or where some of the strands may be of one material or the strands may be of different colors, and various types of tapes such as electrical insulation tapes. For example, the high speed loom of FIGS. 14 and 15 may be used to produce a narrow web of glass fibers for reinforcing binding or packaging tapes at extremely high speed.

The principal advantages of the instant invention lie in the fact that the cloth-like mass or fabric can be continuously produced right at the place of initial production of the continuous glass fiber strand. By running a conveyor beneath a series of glass fiber strand forming stations all of the glass fiber strand produced from as many as, say, 10 or 12 strand forming apparatuses or "bushings" can be accumulated in a single product without intervening packaging, winding and unwinding operations.

We claim:
1. A method for forming thin, freely flexible masses of oriented pattern, freely flexible, multifilament strand comprising projecting a continuous, freely flexible, multifilament strand along a linear path extending at least to the edge of an area, moving generally planar strand receiving means at a constant speed linearly along said area in a direction transverse to the linear path of projection of said strand, directing a jet of fluid across the lineal path of movement of said strand alternately in a direction extending diagonally across said strand receiving means in the direction of movement thereof and diagonally across said strand receiving means contra to the direction of movement thereof by alternately actuating intersecting angularly directed jets for interrupting the lineal movement of said continuous strand at a point adjacent the edge of said area and laterally deflecting at least a portion of said strand, continuing feeding said strand past the point of deflection thereof and over said receiving means for projecting a growing loop in said continuous strand over said strand receiving means with the first formed end of said loop being the last end of a preceding loop at said edge of said area and the center of said loop moving out- wardly over said area as said loop elongates, stopping the formation of said loop by again laterally deflecting a similar portion of said strand at such point, repeating such cycle of deflection and formation, and depositing each such loop on said receiving means after formation, and before the formation of a subsequent loop the movement of said strand receiving means carrying each of said loops away after formation and before formation of a subsequent loop, whereby said loops are deposited in oriented relationship and controlled spacing on said strand receiving means.

2. A method for forming an oriented pattern clothlike mass of continuous strand having a uniform controlled density, said method comprising, moving a sheetlike conveyor at a constant speed along a horizontal area, linearly feeding a continuous strand downwardly along a vertical path located adjacent an edge of said conveyor, deflecting said strand horizontally over said conveyor in a controlled pattern by alternately directing two fluid jets against said strand at a point just above the level of said conveyor, said jets being directed along lines intersecting angularly at the vertical path of said strand, each of said jets being activated for a period long enough to carry said strand in a doubled loop from said vertical path across and to the opposite edge of said conveyor, each of said jets being at least substantially completely deactivated during activation of the other, whereby each jet deflects a precise loop along the path of the jet commencing at the vertical path of said strand and continuing the moving of said conveyor as the formed loops are deposited thereon by gravity.

3. A method according to claim 2 in which a continuous strand is fed downwardly on each side of said conveyor, each of said strands being alternately deflected angularly over said conveyor along intersecting lines, one extending forwardly in the direction of movement of said conveyor and the other extending rearwardly thereof, and the strands are deflected oppositely from opposite sides of said conveyor.

4. Apparatus for forming a thin, freely flexible mass of oriented pattern multifilament strand comprising, means for feeding a continuous, freely flexible, multifilament strand along a linear path, means for interrupting the linear movement of said strand at spaced intervals therealong and thereby forming serially connected loops in said strand, said interrupting means comprising a pair of fluid jets directed angularly to each other and converging on the linear path of movement of said strand and aimed over said strand receiving means and valve mechanism for alternately actuating said jets, generally planar strand loop receiving means linearly movable along an area adjacent said interrupting means, means for moving said receiving means at a controlled speed and means for effecting deposition of each of the loops of strand on said receiving means after each such loop is completed and prior to the formation of a subsequent loop.

5. Apparatus for forming a controlled pattern mass from a continuous strand, said apparatus comprising means for feeding a continuous strand downwardly along a vertical linear path leading to the edge of a rectilinear area, means for moving a generally planar strand loop receiver along said area, a pair of fluid jets positioned adjacent the edge of said area and angularly directed along lines intersecting the linear path of said strand and extending horizontally across said loop receiver, valve mechanism for alternately activating said jets, means for operating said valve mechanism at intervals determined by the ratio between the lineal speed of said strand and twice the distance from the point of jet impingement on said strand to the opposite side of said loop receiver, and means for moving said loop receiver at a controlled speed.

6. Apparatus according to claim 5 having two of said pairs of fluid jets and valve mechanisms located on opposite sides of said loop receiver and means for synchronizing the operation of said valve mechanisms for simultaneously activating jets in said pairs of jets having non-intersecting lines of direction across said area.

References Cited in the file of this patent

UNITED STATES PATENTS

| | | |
|---|---|---|
| 334,453 | Morgan | Jan. 19, 1886 |
| 1,637,139 | Clow et al. | July 26, 1927 |
| 2,308,849 | Young | Jan. 19, 1943 |
| 2,447,131 | McDermott | Aug. 17, 1948 |
| 2,552,317 | Hart | May 8, 1951 |
| 2,719,352 | Slayter et al. | Oct. 4, 1955 |
| 2,721,371 | Hodkinson et al. | Oct. 25, 1955 |

FOREIGN PATENTS

| | | |
|---|---|---|
| 159,324 | Australia | Oct. 14, 1954 |